(12) United States Patent
Yamaguchi (10) Patent No.: US 7,003,549 B2
(45) Date of Patent: Feb. 21, 2006

(54) NETWORK SYSTEM AND A PURCHASING METHOD USING THE NETWORK SYSTEM, PLUG-IN SOFTWARE FOR AN INTERNET BROWSER, NETWORK SYSTEM USING THE PLUG-IN SOFTWARE AND A PURCHASING METHOD USING THE NETWORK SYSTEM

(75) Inventor: Yukio Yamaguchi, Imaichi (JP)

(73) Assignee: KK-Di-Nikko Engineering, Tochigi (JP)

( * ) Notice: Subject to any disclaimer, the term of this patent is extended or adjusted under 35 U.S.C. 154(b) by 775 days.

(21) Appl. No.: 09/876,711

(22) Filed: Jun. 7, 2001

(65) Prior Publication Data

US 2002/0112059 A1 Aug. 15, 2002

(30) Foreign Application Priority Data

Feb. 9, 2001 (JP) .............................. 2001-033272

(51) Int. Cl.
*G06F 15/16* (2006.01)
(52) U.S. Cl. ....................... 709/204; 709/212; 709/217; 709/227; 707/2; 705/1
(58) Field of Classification Search ................ 709/204, 709/212, 217, 227; 707/2; 705/1
See application file for complete search history.

(56) References Cited

U.S. PATENT DOCUMENTS

| 5,715,403 | A | * | 2/1998 | Stefik ........................... 705/44 |
| 6,088,799 | A | * | 7/2000 | Morgan et al. ............. 713/182 |
| 6,219,790 | B1 | * | 4/2001 | Lloyd et al. ................... 726/14 |
| 6,345,308 | B1 | * | 2/2002 | Abe ........................... 709/248 |
| 6,421,768 | B1 | * | 7/2002 | Purpura ...................... 711/164 |
| 6,609,120 | B1 | * | 8/2003 | Honarvar et al. .............. 707/3 |
| 6,751,659 | B1 | * | 6/2004 | Fenger et al. ............... 709/223 |
| 2002/0069152 | A1 | * | 6/2002 | B.C et al. ..................... 705/37 |
| 2002/0087414 | A1 | * | 7/2002 | Takatsu ...................... 705/18 |
| 2002/0099566 | A1 | * | 7/2002 | Kobayashi .................... 705/1 |
| 2002/0129135 | A1 | * | 9/2002 | Delany et al. ............. 709/223 |
| 2003/0028407 | A1 | * | 2/2003 | Ibaraki et al. ................. 705/7 |
| 2003/0135541 | A1 | * | 7/2003 | Maeda et al. ............... 709/202 |

* cited by examiner

*Primary Examiner*—David Wiley
*Assistant Examiner*—Alina Boutah
(74) *Attorney, Agent, or Firm*—Hamre, Schumann, Mueller & Larson, P.C.

(57) ABSTRACT

A server 1 and client 2 have system clock synchronous means 9, 14 for synchronizing a system clocks 6, 12 to the Internet Standard Time, storing means 4, 11 for arranging and storing a plurality of log-in IDs for authenticating said server 1 and client 2 mutually, and log-in ID changing means 8, 13 for searching repeatedly from the top to the bottom of a plurality of log-in IDs stored in said storing means 4, 11, and updating a log-in ID searched at predetermined intervals as the most current log-in ID every time searching.

5 Claims, 6 Drawing Sheets

FIRST-TIME FORMALITY ID ····· jU7yM9637Hu (USER ID)
ki8duiUY7T6e (PASSWORD)

START TIME OF SYNCHRONIZATION    20001/1/15 9:31:23

| ID REFERENCE ADDRESS | LOG-IN ID REFERENCE TIME FOR LONG | LOG-IN ID ||
|---|---|---|---|
| | | USER ID | PASSWORD |
| 1 | 2001/1/15 9:31:23 | 96579077404 | 59676178201 |
| 2 | 2001/1/15 9:31:33 | 87881310599 | 15216224771 |
| 3 | 2001/1/15 9:31:43 | 51956737385 | 62630494199 |
| 4 | 2001/1/15 9:31:53 | 88250554360 | 95462936340 |
| 5 | 2001/1/15 9:32:03 | 29827068452 | 13458337261 |
| 6 | 2001/1/15 9:32:13 | 52771966934 | 51042900482 |
| 7 | 2001/1/15 9:32:23 | 94619954035 | 90492812361 |
| 8 | 2001/1/15 9:32:33 | 83701274775 | 56304791784 |
| 9 | 2001/1/15 9:32:43 | 51352263194 | 31996250086 |
| 10 | 2001/1/15 9:32:53 | 51709527937 | 62438739797 |
| 11 | 2001/1/15 9:33:03 | 60406571435 | 91675115165 |
| 12 | 2001/1/15 9:33:13 | 74070766492 | 64837648143 |
| 13 | 2001/1/15 9:33:23 | 70130420893 | 15786957026 |
| 14 | 2001/1/15 9:33:33 | 71996289253 | 69870140949 |
| 15 | 2001/1/15 9:33:43 | 96689450804 | 53913793436 |
| 16 | 2001/1/15 9:33:53 | 82290445273 | 74267819843 |
| 17 | 2001/1/15 9:34:03 | 38579455542 | 74906133298 |
| 18 | 2001/1/15 9:34:13 | 99655809838 | 99027978152 |
| 19 | 2001/1/15 9:34:23 | 93103578903 | 43302911646 |
| 20 | 2001/1/15 9:34:33 | 91381106860 | 52939840160 |
| 21 | 2001/1/15 9:34:43 | 74983174604 | 34887670007 |
| 22 | 2001/1/15 9:34:53 | 30890484307 | 99095179205 |
| 23 | 2001/1/15 9:35:03 | 99028231310 | 77392390810 |
| 24 | 2001/1/15 9:35:13 | 91802842573 | 16849612259 |
| 25 | 2001/1/15 9:35:23 | 11746909420 | 57772221950 |
| 26 | 2001/1/15 9:35:33 | 21244702311 | 85555625088 |
| 27 | 2001/1/15 9:35:43 | 62926693146 | 24186089898 |
| 28 | 2001/1/15 9:35:53 | 52721589889 | 99866998957 |
| 29 | 2001/1/15 9:36:03 | 14929461082 | 43369983434 |
| 30 | 2001/1/15 9:36:13 | 57740005814 | 85729795681 |
| 31 | 2001/1/15 9:36:23 | 73456085988 | 33353191486 |
| 32 | 2001/1/15 9:36:33 | 82826279431 | 58022990788 |
| ⁓ | ⁓ | ⁓ | ⁓ |
| 995 | 2001/1/15 9:38:03 | 58894539968 | 24409729457 |
| 996 | 2001/1/15 9:38:13 | 49085697524 | 91768079531 |
| 997 | 2001/1/15 9:38:23 | 75441772738 | 34782755659 |
| 998 | 2001/1/15 9:38:33 | 22576023343 | 40257948552 |
| 999 | 2001/1/15 9:38:43 | 94445428605 | 69687029290 |
| 1000 | 2001/1/15 9:38:53 | 17447353278 | 71589243710 |

※If a client succeeds in log-in in a server through first-time attestation, a server will determine the time which updates a LOG-IN ID to the newest LOG-IN ID as a LOG-IN ID reference time.

NETWORK SYSTEM AND A PURCHASING METHOD USING THE NETWORK SYSTEM, PLUG-IN SOFTWARE FOR AN INTERNET BROWSER, NETWORK SYSTEM USING THE PLUG-IN SOFTWARE AND A PURCHASING METHOD USING THE NETWORK SYSTEM

FIELD OF THE INVENTION

The present invention relates to a network system for connecting a specific client to a specific server via the Internet and a method for purchasing a purchase using the network system, plug-in software for an Internet browser, a network system using the plug-in software and a method for purchasing a purchase using the network system.

BACKGROUND OF THE INVENTION

Generally, a server on the Internet has any number of pieces of electronic information requiring the duty to protect the information. Connecting a client to a server on the Internet, an open Web browser (Internet browser) is often used and a third party can easily access the server. Therefore, in such an Internet environment, for ensuring security of electronic information, data encryption and authentication technology for logging in are required.

For example,

① a user to access the server is given a password and a user ID for identification (hereafter, these are brought together and referred to as a log-in ID), ② said log-in ID is a combination of characters and numerical characters on a random basis, ③ said log-in ID is encrypted, therefore, the server is prevented from third-party stealing and browsing.

However, in the case of ②, when a combination of characters and numerical characters on a random basis is to be an ideal log-in ID, the log-in ID is difficult remember and easy to forget. Therefore, in actuality, the date of birth, postal address or the like can only used for an log-in ID, which is easily guessed by a third party, or a log-in ID has no choice but to be separately maintained in a form or the like and stored. As mentioned above, the log-in ID is easily stolen, and when the log-in ID is stolen, the worth of the log-in ID is impaired. Therefore, no matter how more advanced cryptographic technology of ③ is, it is difficult to prevent a log-in ID from being stolen and the log-in ID is forced to be made complicated changes.

Therefore, technical problems arise that should be resolved in order to make changes automatically on a regular basis to a password for authenticating a server and a client mutually. An object of the present invention is to resolve these problems.

SUMMARY OF THE INVENTION

A first aspect of the present invention provides a network system for connecting a client to a server via the Internet, wherein when a log-in ID transmitted by said client matches a log-in ID stored in said server, said client receives permission to log in to said server;

wherein said server and client have:

system clock synchronous means for synchronizing a system clock to the Internet Standard Time;

storing means for arranging and storing a plurality of log-in IDs for authenticating said server and client mutually; and log-in ID changing means for searching repeatedly from the top to the bottom of a plurality of log-in IDs stored in said storing means, and updating a log-in ID searched at predetermined intervals as the most current log-in ID every time searching.

A second aspect of the present invention provides a method for purchasing a purchase using the network system of the first aspect, comprising:

placing a client on a manufacturer or vendor of an electrical and electronic component;

storing in a server purchase information about specifications, a price and the like and test information about quality, performance, compatibility and the like regarding an electrical and electronic component; and ordering from said manufacturer or vendor via the Internet an electrical and electronic component studied on the basis of stored information in said server.

A third aspect of the present invention provides plug-in software for an Internet browser operating a computer as communication means transmitting and receiving electronic data via the Internet;

wherein said computer is operated as:

system clock synchronous means for getting the Internet Standard Time from the Internet and for synchronizing a system clock of said computer to the Internet Standard Time;

storing means for arranging and storing a plurality of log-in IDs previously received permission from a computer on the side of a server;

log-in ID changing means for searching repeatedly from the top to the bottom of a plurality of log-in IDs stored in said storing means, and updating a log-in ID searched at predetermined intervals as the most current log-in ID every time searching; and transmit/receive means for transmitting the most current log-in ID to the computer on the side of said server and logging in to said server.

A fourth aspect of the present invention provides a network system using the plug-in software for an Internet browser of the third aspect, wherein a computer with said plug-in software for an Internet browser installed is connected as a client to the Internet and information is transmitted and received between a server and said client.

A fifth aspect of the present invention provides a method for purchasing a purchase using the network system of the fourth aspect, comprising:

placing a client on a manufacturer or vendor of an electrical and electronic component;

storing in a server purchase information about specifications, a price and the like and test information about quality, performance, compatibility and the like regarding an electrical and electronic component; and ordering from said manufacturer or vendor via the Internet an electrical and electronic component studied on the basis of stored information in said server.

BRIEF DESCRIPTION OF THE DRAWINGS

FIG. 6 is a view showing reference times of a log-in ID and a log-in ID decided every reference time of a network system according to the present invention.

DESCRIPTION OF THE PREFERRED EMBODIMENTS

Figure 1:
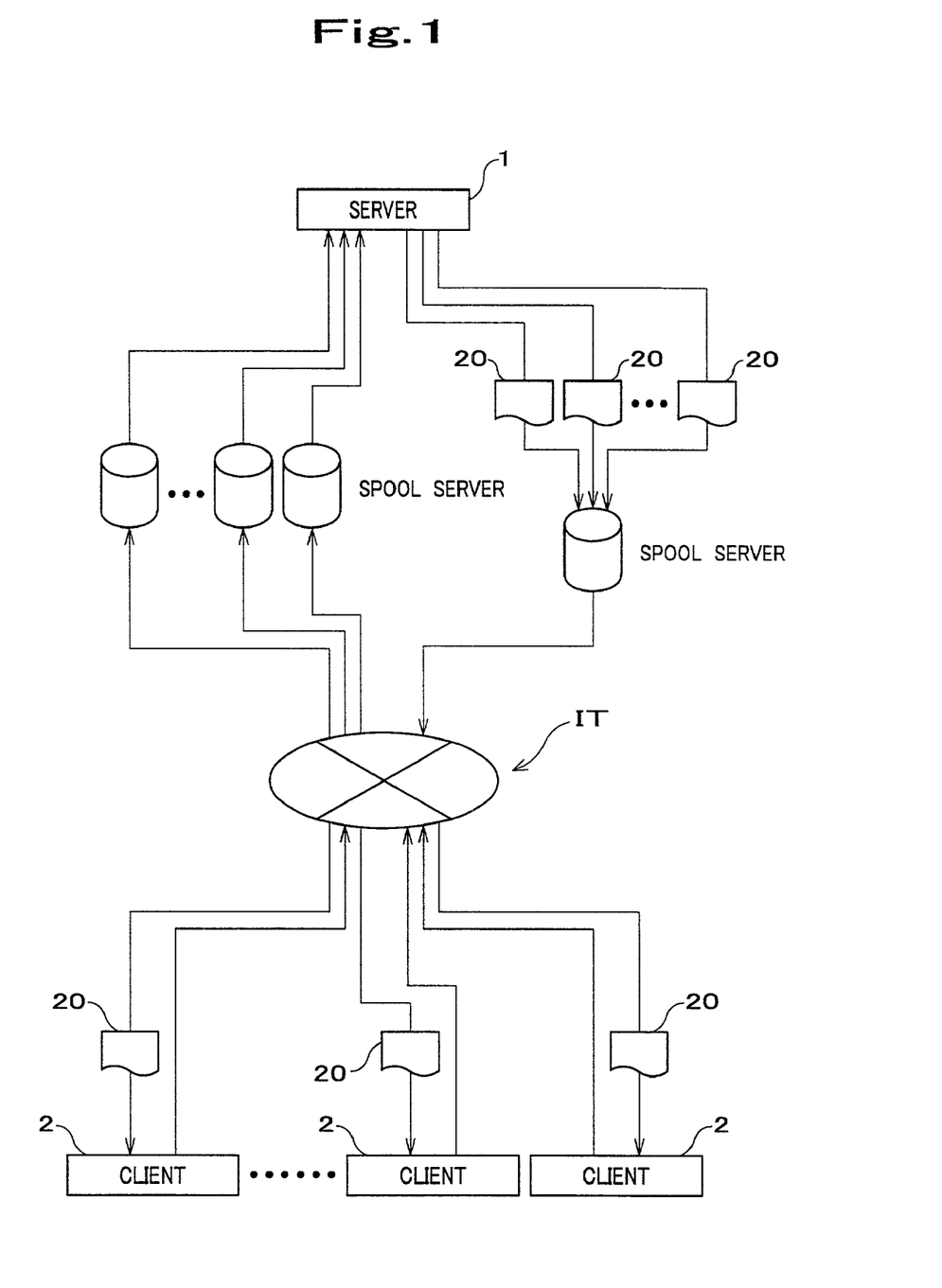
FIG. 1 is a schematic block diagram showing a network system according to the present invention.

An embodiment of the present invention will now be described by referring to FIGS. 1 to 6. FIG. 1 is a block diagram showing a network system of the present invention and FIGS. 2 and 3 are block diagrams showing a system of a server and client.

As shown in FIG. 1, the network system connects a server 1 to a plurality of clients 2 on the open Internet wherein the server 1 and the client 2 comprise a computer.

Figure 2A:
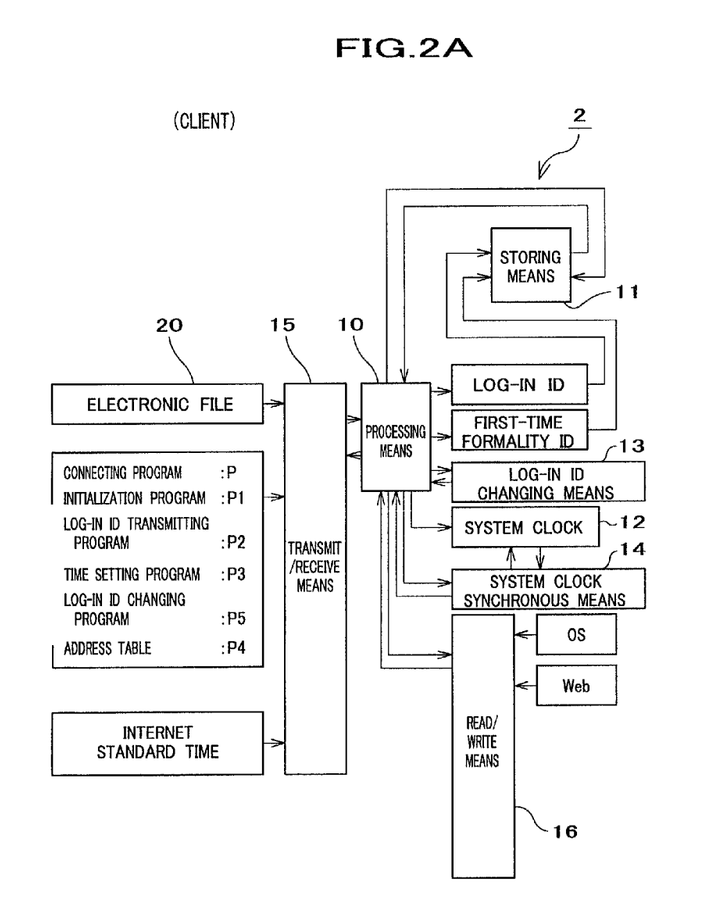
FIG. 2 is a block diagram showing functions of a server and client according to the present invention.
Figure 2B:
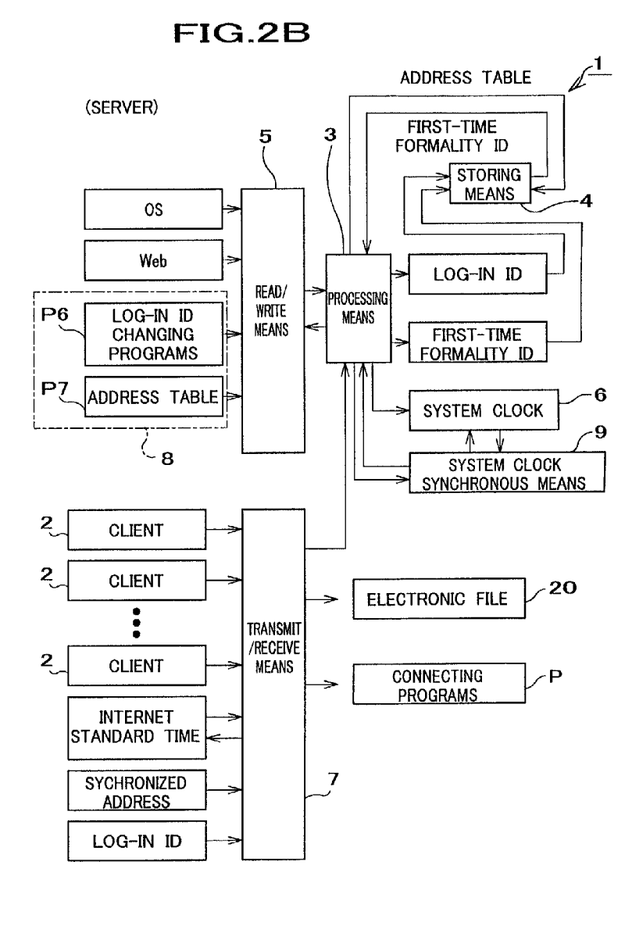

As shown in FIG. 2, starting media of the server 1, e.g., a hard disc (storing means), comes preinstalled with an operating system (OS), software and a maintenance program. The operating system operates the server 1 as a computer. The software operates the server 1 as an Internet browser (hereafter referred to as the Web). The maintenance program always prohibits an unauthorized person from cracking such as browsing data, rewriting and the like. Starting media of the client 2, e.g., a hard disc (storing means), comes preinstalled with an operating system OS and software. The operating system operates the client 2 as a computer. The software operates the client 2 as the Web. The operating system OS used by the server 1 may be identical with the operating system OS used by the client 2 or may be different to it, as well known.

Figure 3:
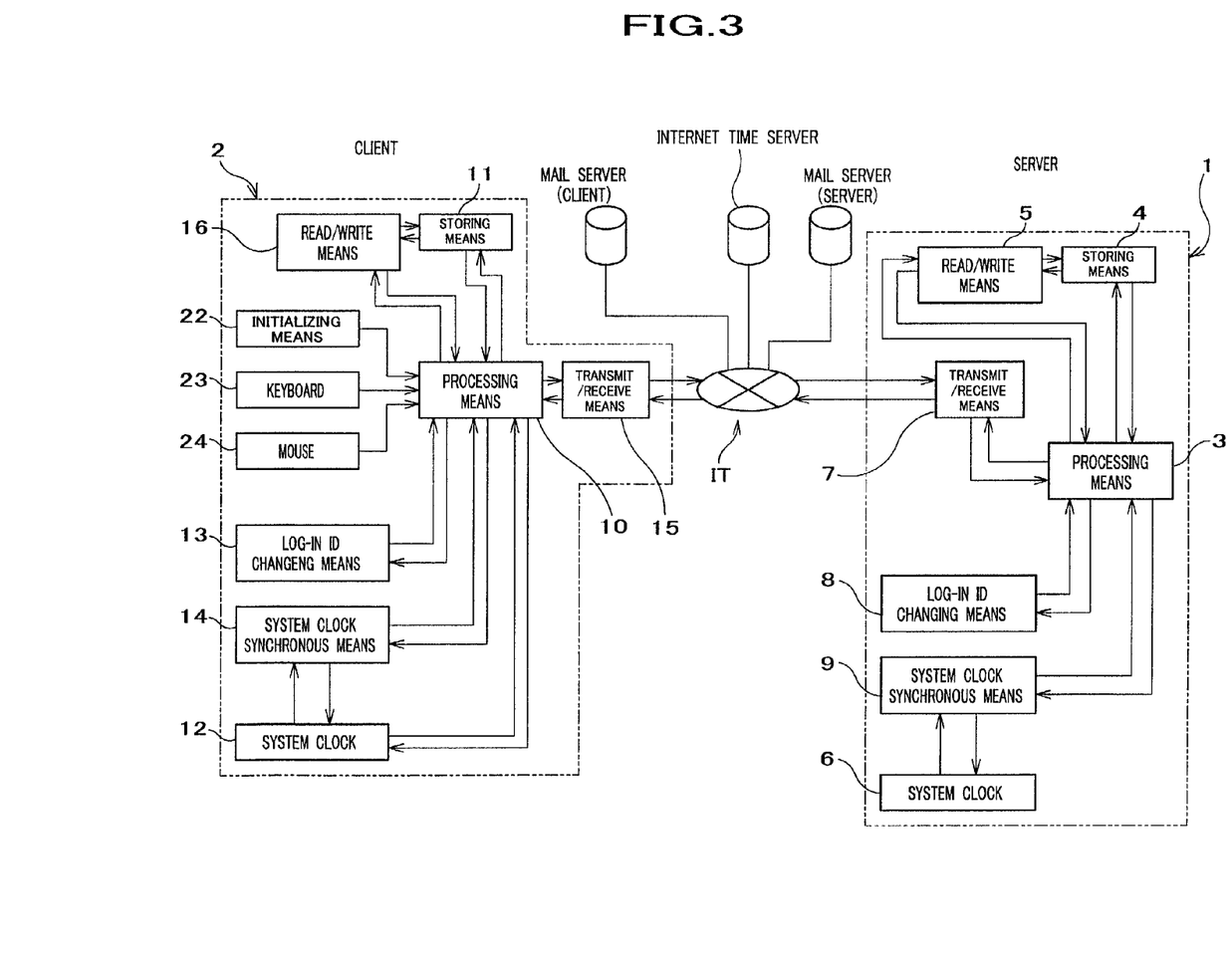
FIG. 3 is a block diagram showing configuration of a server and client according to the present invention.

As shown in FIGS. 2 and 3, the server 1 has hardware resources such as processing means (CPU or MPU) 3 for processing data, storing means (HD: hard disc, memory, and the like) 4 for storing data, read/write means (FDD and the like) 5 for reading and writing data, a system clock 6, transmit/receive means 7 for transmitting and receiving, and the like. The server 1 further has log-in ID changing means 8 for changing a log-in ID to be collated with a log-in ID of the client 2, and system clock synchronous means 9 for synchronizing the system clock 6 to the Internet Standard Time.

In a like manner, the client 2 has processing means (CPU or MPU) 10 for processing data, storing means (HD: hard disc, memory, and the like) 11 for storing data, read/write means (FDD and the like) 16 for reading and writing data, a system clock 12. The client 2 further has log-in ID changing means 13 for controlling these hardware resources and changing a log-in ID to be collated with a log-in ID of the server 1, system clock synchronous means 14 for synchronizing the system clock 12 to the Internet Standard Time, transmit/receive means 15 for transmitting and receiving, and the like.

Next, operation and procedure of the server 1 and the client 2 will now be described by referring to FIGS. 1 to 4 between the instant when the client 2 logs in for the first time and the instant when a log-in ID is changed.

When the client 2 requests log-in from the server 1 via the Internet, the processing means 3 of the server 1 determines by the presence or absence of a log-in ID whether the client 2 is a first-time client which requests log-in for the first time, i.e., whether the client 2 is a first-time network subscriber.

More specifically, when the client 2 transmits a log-in ID mutually authenticated by the server 1 and the client 2, the processing means 3 of the server 1 regards the client 2 as an authorized network subscriber and gives permission to log in to the server 1. When the client 2 transmits a log-in ID not mutually authenticated by the server 1 and the client 2, the processing means 3 regards the client 2 as a first-time client and asks to conclude a contract for subscription to the network. A log-in ID for receiving permission of log-in from that time onward is given to only the client 2 who has concluded a contract. With the log-in ID, a log-in ID for mutual authentication is changed automatically between the server 1 and the client 2 to subscribe to the network. Therefore, authentication of the client 2 is convenient and the security of the network is ensured.

Figure 4:
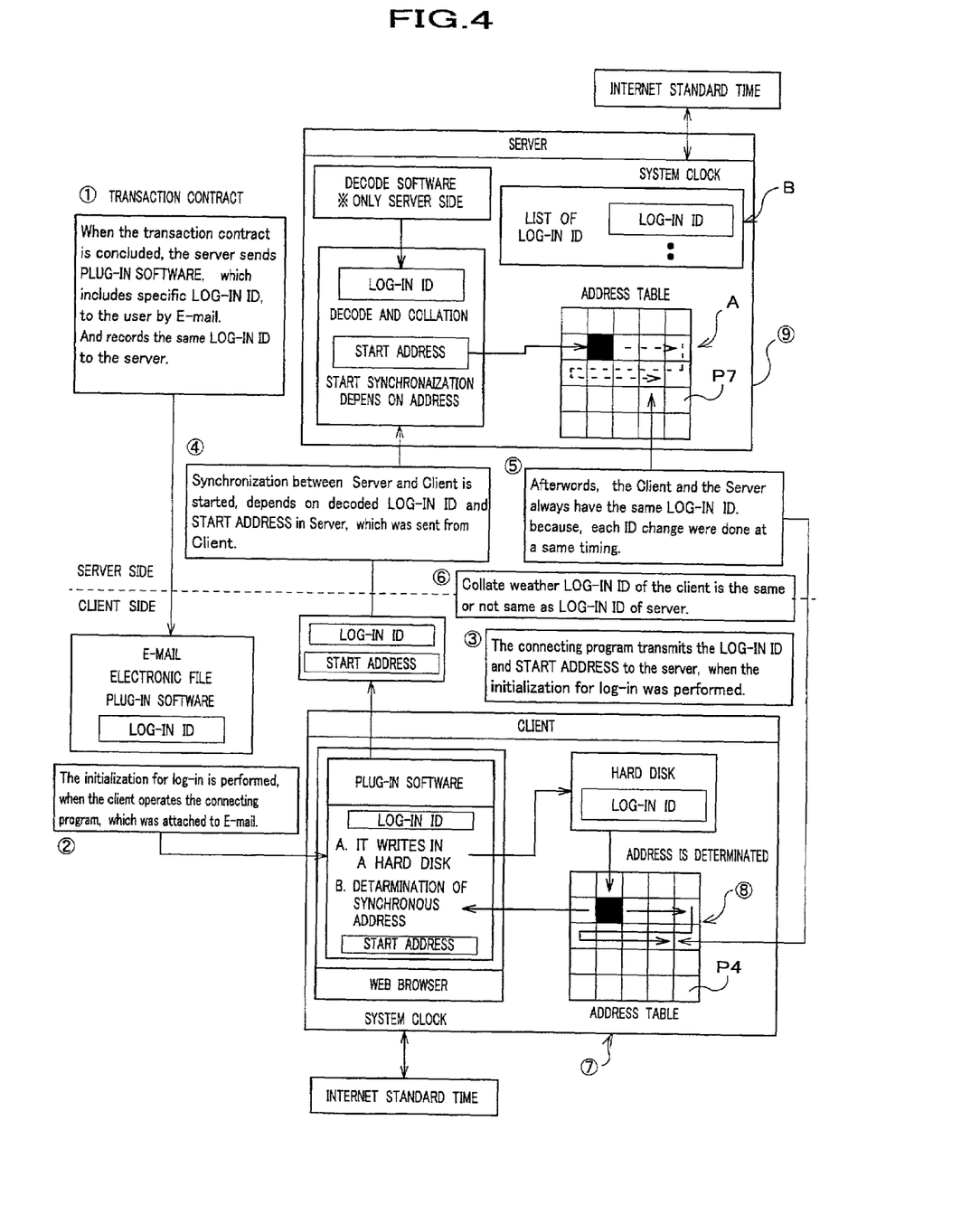
FIG. 4 is a block diagram showing a procedure of log-in of a client to a server according to the present invention.

Specifically speaking, as shown in FIGS. 2 and 4, first, the server 1 concludes a transaction contract with a network subscriber operating the client 2. Next, the server 1 transmits a connecting program P to the client 2 for subscription to the network (see FIG. 2 and ① of FIG. 4). The client 2 operates the connecting program P, initialization for log-in is performed (see ② of FIG. 4) and a log-in ID and start address are transmitted to the server 1 (see ③ of FIG. 4) by the connecting program P transmitted to the client 2. The log-in ID is mutually authenticated by the server 1 and the client 2. The server 1 performs reconstruction of the log-in ID and start address transmitted by the client 2, and authentication for the first time is performed. The server 1 changes the shared log-in ID of the server 1 and the client 2 on the basis of the Internet Standard Time at predetermined intervals (see ④ of FIG. 4). Therefore, authentication of the client 2 is convenient and the security of the network is improved (see ⑤ and ⑥ of FIG. 4).

The transaction contract will now be described in detail. The processing means 3 of the server 1 reads electronic file 20 previously stored in the storing means 4 and transmits the electronic file 20 to the client 2 via the Internet IT (see FIG. 1). The client 2 receives the electronic file 20 and responds a network subscription signal. The transaction contract is completed by the transmitting operation and the response operation.

In this case, the electronic file 20 includes protect contract provisions regarding the duty of the server 1 and the client 2 to mutually protect information, cancellation provisions, penal provisions applicable to nonperformance of the duty, and provisions required by law for the contract. The electronic file 20 further includes an explanation of handling regarding access to the server 1. The electronic file 20 displays a consent button (not shown) for the client 2 to conclude the contract and a cancellation button (not shown) for the client 2 not to conclude the contract and reject it. The consent button and cancellation button correspond to operation of a keyboard 23 and a mouse 24 of the client 2. Therefore, when the client 2 pushes the consent button, a network subscription signal is transmitted to the server 1. When the client 2 pushes the cancellation button, a network non-subscription signal is transmitted to the server 1.

When the client 2 pushes the consent button and a network subscription signal is transmitted to the server 1, the server 1 regards the client 2 as a user of an authorized subscriber to the network of the server 1. The server 1 attaches the connecting program P to e-mail and transmits it to the client 2, and, onto the storing means 4 of the server 1, records a log-in ID for log-in formalities (hereafter, referred to as a first-time formality ID) included in the connecting program P transmitted to the client 2. Thus, the transaction contract with the client 2 is completed.

Next, the user of the client 2 operates the connecting program P and performs formalities for log-in (see ② of FIG. 4).

As shown in FIG. 2, the connecting program P is the so-called plug-in software for extending the functionality of the Web of the client 2. The connecting program P includes an initialization program P1, a log-in ID transmitting program P2, a time setting program P3, and a log-in ID changing program P5. The initialization program P1 is initiated only at first-time log-in. The log-in ID transmitting program P2 transmits automatically a first-time formality ID and a log-in ID to the client 2. The time setting program P3 makes the client 2 log in to the Internet time server (see FIG. 3) of the Internet IT to get the Internet Standard Time, and synchronizes the system clock 12 of the client 2 to the Internet Standard Time. The log-in ID changing program P5 changes the log-in ID on the basis of an address table P4 for decisions about a log-in ID.

When the usr of the client 2 initiates the connecting program P, the initialization program P1 shown in FIG. 2 is initiated firstly and subsequently the time setting program P3 is initiated.

The initialization program P1 initiates initialization means 22 shown in FIG. 3 and it is initiated only one-time for getting a log-in ID. When the initialization program P1 is initiated, a first-time formality ID attached to the connecting program P is stored in the storing means 11 of the client 2, and a first-time formality ID preinstalled on the connecting program P is erased from the storing means 11. In the embodiment of FIG. 4, a first-time formality ID is stored in a hard disc.

The time setting program P3 operates the system clock synchronous means 14. When the time setting program P3 is initiated, it gets the Internet Standard Time from the Internet time server connected to the Internet IT, and subsequently synchronizes the system clock 12 of the client 2 to the Internet Standard Time. Thus, the time setting program P3 is completed. The time setting program P3 may be initiated before operating the initialization program P1.

The initialization program P1 and the time setting program P3 are completed, and the log-in ID transmitting program P2 is initiated. The first-time formality ID stored in the storing means 11 of the client 2 is transmitted to the server 1.

The processing means 3 of the server 1 collates the first-time formality ID transmitted from the client 2 with a log-in inquiry list (not shown) stored in the storing means 4 of the server 1. At first-time log-in, the first-time formality ID of the server 1 matches the first-time formality ID of the client 2. Therefore, the client 2 is not rejected and can log in to the server 1.

When the first-time formality ID is transmitted, a log-in ID changing program P6 shown in FIG. 2 transmits a log-in ID changing signal to the log-in ID changing program P5 of the client 2 in order to change a log-in ID. Therefore, the processing means 10 of the client 2 initiates the log-in ID changing means 13 of the client 2 and starts the change in the log-in ID.

The log-in ID changing program P6 of the server 1 comes installed with a time setting program (not shown) as a part thereof. The time setting program is initiated on a regular basis or as required by the client 2 to log in. The time setting program operates the system clock synchronous means 9 of the server 1 to get the Internet Standard Time from the Internet time server of the Internet IT, and synchronizes the system clock 6 of the server 1 to the Internet Standard Time.

The log-in ID changing means 8 of the server 1 is initiated and the server 1 transmits a start signal for changing a log-in ID toward the client 2. The log-in ID changing program P5 of the client 2 is initiated, and starts the change in the log-in ID.

First, a log-in ID is decided on the basis of the address table P4 stored in the storing means 11 of the client 2 (see ⑦ of FIG. 4).

The address table P4 of the client 2 is identical to an address table P7 stored in the storing means 4 of the server 1. Each of the addresses from the top to the bottom of the address table P4 links with a mutually different log-in ID. Each log-in ID is made on the basis of its own random numbers table and enciphered highly.

The log-in ID changing program P5 of the client 2 is initiated and the log-in ID changing means 13 of the client 2 shown in FIG. 3 is operated. The log-in ID changing means 13 performs addition wherein a predetermined address of the address table P4 of the client 2, e.g., a top address, is set to a start address, from the top to the bottom of the address table P4. An addition address is obtained from the addition by the log-in ID changing means 13 at predetermined intervals, and links with one log-in ID. The log-in ID changing means 13 recognizes this log-in ID as the most current log-in ID every addition (see ⑧ of FIG. 4), and transmits the most current log-in ID and the addition address linking therewith to the server 1 every addition (see ③ of FIG. 4).

The most current log-in ID and the addition address linking therewith are stored in the storing means 11 of the client 2 every addition, and the last time log-in ID and the addition address linking therewith are erased. FIG. 6 is one example of reference times of a log-in ID and a log-in ID decided every reference time.

On the side of the server 1, when the client 2 transmits a log-in ID changing command to the server 1 for the first time, the log-in ID changing means 8 decides a log-in ID on the basis of the address table P7 to collate (see ⑨ of FIG. 4). The address table P7 is identical to the address table P4 of the client 2.

In this case, as is the case with the log-in ID changing means 13 of the client 2, the log-in ID changing means 8 performs addition from a predetermined start address to the bottom of the address table P7 repeatedly. An addition address is obtained from the addition by the log-in ID changing means 8 at predetermined intervals, and links with one log-in ID. The log-in ID changing means 8 recognizes this log-in ID as a collating log-in ID every addition (see A of FIG. 4).

At first, the addition address links with the most current log-in ID, which is transmitted from the client 2 for the first time, and the addition address is set to the start address. A log-in ID linking with the start address is used for collating, and the client 2 receives permission to continue to log in.

Next, a log-in ID links with the addition address obtained from the addition at predetermined intervals in synchronism with the client 2, and this log-in ID is set to the most current collating log-in ID every addition.

The most current log-in ID and the addition address linking therewith are stored in the storing means 4 of the server 1, and more specifically, in a log-in ID list (see B of FIG. 4). The last time collating log-in ID and the addition address linking therewith are erased from the storing means 4 of the server 1.

Therefore, the most current log-in ID transmitted from the client 2 matches always the most current log-in ID of the server 1, and the client 2 can continue to log in.

After log-off of the client 2, when the client 2 requests log-in again, both the client 2 and the server 1 collate the most current log-in ID. Therefore, log-in of the client 2 to the server 1 is ensured.

Therefore, the user of the client 2 (network subscriber) has access to the server 1 using the log-in ID changed automatically at predetermined intervals. An administrator operating the server 1 rejects access except in cases where the specific client 2 who has concluded a contract accesses the server 1. Thus, the security is ensured up to a point. The first-time formality ID is erased from the client 2 and from the server 1 at the completion of the first-time formalities for log-in. Therefore, even if a third party copies and steals the connecting program P, the third party cannot log in to the server 1. As a result, the security is substantially improved also in this respect.

A network system for purchasing an electrical and electronic component will now be described below as a commercial network system for purchasing an electrical and electronic component.

A price of an electrical and electronic component varies as well known with labor costs, production facilities, production environment, political realities, an economy, and the like. Especially, technological innovation of an electrical and electronic component used for a computer, a printer, a cellular phone, or the like has made remarkable progress in recent years. Assuming that the supply from production capacity of one company is insufficient, the fact is that the company places specifications of an electrical and electronic component and interchangeable component in the public domain, and the company licenses to manufacture the an electrical and electronic component. On the other hand, a licensed producer and producer of the interchangeable component wants to get competitiveness of the products thereof therefore intends to set the products thereof at low prices with the added functions. A circuit designer, i.e., recruiter of the interchangeable component, wants to make a reappraisal of the circuit, cut costs, and the like therefore contemplates aggressively using the interchangeable component put on the market later. However, even if the price, performance, and the like of the interchangeable component are superior to others, there is no guarantee that the interchangeable component is operated with stability in fact and compatible with the electrical and electronic component.

Therefore, as an alternative to the circuit designer, there is a need for business to survey the price, specifications, and the like of an electrical and electronic component, to check whether the electrical and electronic component is operated with stability in fact to provide the information with the circuit designer.

Figure 5:
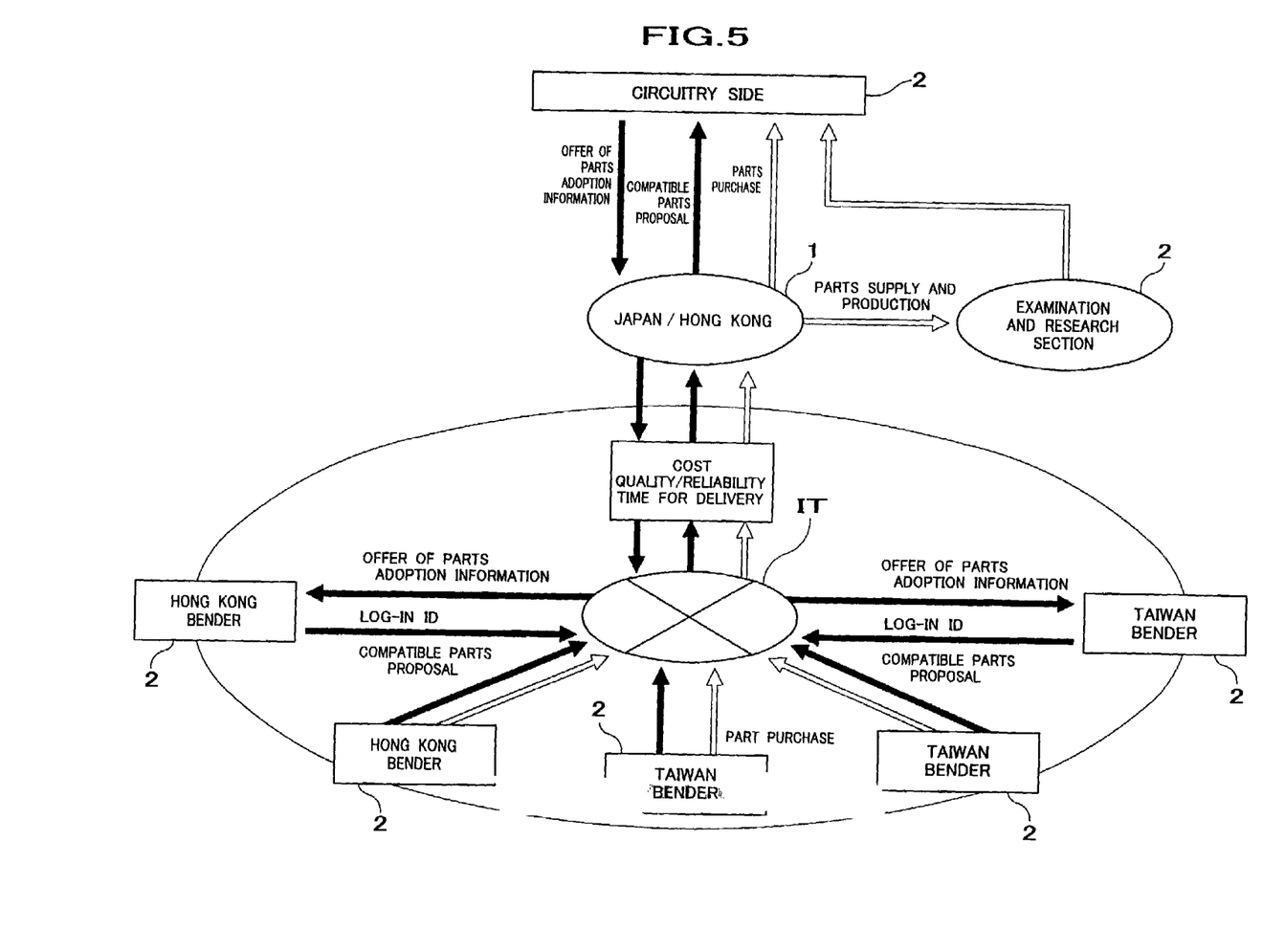
FIG. 5 is a block diagram showing a network system for purchasing an electrical and electronic component according to the present invention.

As shown in FIG. 5, the client 2 is placed on an electrical and electronic component producing region of each country, i.e., neighboring countries such as Hong Kong, Taiwan, or the like, or on a manufacturer thereof, or in the vicinity of the market. Purchase information about specifications, price, quality and the like provided by the client 2 and test information about an acceptance test, performance test and the like in a segment of test and research are stored in the server 1 in real time via the Internet IT.

Of course, the client 2 is also placed on the circuit designer and the segment of test and research, and connected each other via the server 1 and the Internet IT. The client 2 on the circuit designer transmits information about specifications, price, stability under operating conditions, adaptation and the like, which are required by the circuit designer, to be stored in the server 1. The client 2 on the segment of test and research transmits the test information about an acceptance test, performance test and the like to be stored in the server 1.

The side of the server 1 grasps the specifications and the like required by the circuit designer and stored in the server 1 and selects a few electrical and electronic components concluded to satisfy the specifications and the like and orders the components from the client 2 placed on a vendor (manufacturer) by e-mail.

The components are delivered to the segment of test and research. The segment of test and research logs in to the server 1 via the client 2 on the segment of test and research. The client 2 on the segment of test and research checks various test points about stability under operating conditions, adaptation and the like, which are required by the circuit designer through the client 2 on the circuit designer.

The results of test performed about the test points are written to an electronic file and stored in the storing means 4 of the server 1.

Of course, the test points includes a point of whether the electrical and electronic component delivered by the vendor is operated with stability in given environment for a given length of time. The tests are performed in the state in which whether the electrical and electronic component delivered by the vendor is implemented on a substrate provided in advance by the circuit designer on the condition set by the circuit designer.

The segment of test and research operates the client 2 thereof to transmit the results of the tests to the client 2 on the circuit designer by e-mail.

The circuit designer selects at least one or more electrical and electronic components concluded to be most desirable, and stores a purchase order in the server 1 by e-mail. At this time, the circuit designer considers the data of the tests, the purchase information about specifications, price and the like, and information about price per lot and delivery time transmitted by the client 2 on the vendor.

The server 1 transmits a document relating to purchase on the basis of the purchase order to the client 2 on the vendor by e-mail.

The vendor sends the electrical and electronic component listed in the document relating to purchase to the segment of test and research or directly to the circuit designer, or sends the electrical and electronic component to the circuit designer wherein an acceptance test on the component has completed.

The vendor may be provided with a substrate for implementation from the circuit designer, and can implement on the substrate the electrical and electronic component purchased by the circuit designer and deliver the component. After receiving approval from the circuit designer, the vendor may distribute at cost the results of the tests in a segment of test and research on the electrical and electronic component purchased by the circuit designer.

Finally, the vendor sends a report about the completion of operation and a bill of the compensation for operation to and receives the compensation from the circuit designer. Thus, test operation and purchase operation as a proxy is completed.

As a consequence, the vendor can timely provide the circuit designer with an electrical and electronic component of high reliability at low cost wherein the component is compatible with the circuit design of the circuit designer, and the substrate with the component implemented thereon.

As described above, in the final analysis, the present invention has significant advantages as follows.

According to the first aspect of the present invention, log-in IDs for authenticating a server and client mutually are changed automatically with synchronizing to both of the server and client. Therefore, while retaining a high level of security a network system can use the open Internet. The price an electrical and electronic component varies frequently and performance thereof is improved rapidly, however, the second and fifth aspects of the present invention makes it possible to survey operation, a price and the like thereof, and to send the component at low cost. According to the third aspect of the present invention, a commercially available computer and Internet browser can be used as-is. According to the fourth aspect of the present invention, a network system of high reliability can be provided at low cost.

What is claimed is:

1. A network system for connecting a client to a server via the Internet, wherein when a log-in ID transmitted by said client matches a log-in ID stored in said server, said client receives permission to log in to said server;

wherein said server and client each have:

a system clock;

system clock synchronous means for synchronizing the system clock to the Internet Standard Time;

storing means for arranging and storing a plurality of log-in IDs for mutually authenticating said server and client; and log-in ID changing means for searching at predetermined intervals from the top to the bottom of the plurality of log-in IDs stored in said storing means, and for every search updating a log-in ID as the most current log-in ID, wherein the log-in ID changing means of the server and the client are synchronized by the respective system clock synchronous means.

2. A purchasing method using the network system as claimed in claim 1, comprising:

placing a said client at a manufacturer or vendor of an electrical and electronic component;

storing in a said server purchase information and test information regarding the electrical and electronic component; and ordering from said manufacturer or vendor via the Internet the electrical and electronic component studied on the basis of the stored information in said server.

3. Plug-in software for an Internet browser operating a computer as communication means transmitting and receiving electronic data via the Internet;

wherein said computer is operated as:

system clock synchronous means for getting the Internet Standard Time from the Internet and for synchronizing a system clock of said computer to the Internet Standard Time;

storing means for arranging and storing a plurality of log-in IDs received from a server;

log-in ID changing means for searching on the basis of the Internet Standard Time at predetermined intervals from the top to the bottom of the plurality of log-in IDs stored in said storing means, and for every search updating a log-in ID as the most current log-in ID; and transmit/receive means for transmitting the most current log-in ID to said server and logging in to said server.

4. A network system using the plug-in software for an Internet browser as claimed in claim 3, wherein a computer with said plug-in software for an Internet browser installed is connected as a client to the Internet and information is transmitted and received between said server and said client.

5. A purchasing method using the network system as claimed in claim 4, comprising:

placing a said client at a manufacturer or vendor of an electrical and electronic component;

storing in a said server purchase information and test information regarding the electrical and electronic component; and ordering from said manufacturer or vendor via the Internet the electrical and electronic component studied on the basis of the stored information in said server.

* * * * *